United States Patent [19]

Shiio et al.

[11] 3,847,744

[45] Nov. 12, 1974

[54] METHOD OF PRODUCING ELASTASES BY BACTERIA

[75] Inventors: Isamu Shiio; Hachiro Ozaki; Tsuyoshi Nakamatsu, all of Kanagawa, Japan

[73] Assignee: Ajinomoto Co., Inc., Tokyo, Japan

[22] Filed: Dec. 11, 1972

[21] Appl. No.: 313,816

[30] Foreign Application Priority Data
Dec. 14, 1971  Japan.................................. 47-2719

[52] U.S. Cl. ................................................. 195/65
[51] Int. Cl............................................. C12d 13/10

[58] Field of Search............................ 195/65, 66 R

[56] References Cited
OTHER PUBLICATIONS

Morihara et al., Archives of Biochemistry & Biophysics, Vol. 120, pages 68–78 (1967).

*Primary Examiner*—Lionel M. Shapiro
*Attorney, Agent, or Firm*—Hans Berman; Kurt Kelman

[57] ABSTRACT

Some strains of Flavobacterium produce highly active elastase. The elastase is useful as a meat tenderizer.

2 Claims, No Drawings

METHOD OF PRODUCING ELASTASES BY BACTERIA

The present invention relates to the preparation of elastases by bacteria.

Elastase decomposes and converts elastin which is a scleroprotein into water soluble protein, and is useful as a meat tenderizer and as a depilatory in the fur industries.

It is known that microorganisms belonging to genera Bacillus, Staphylococcus, Flavobacterium, Pseudomonas and Streptomyces produce elastase, however, the elastase activity of the known elastases is very low.

It has now been found that new strains of Flavobacterium produce highly active elastase in a very large amount in the culture broth.

Bacteria which produce the elastase include *Flavobacterium immotum* No. 9-35 (FERM P-1308; Microorganisms identified by FERM P- numbers are available to the public from the Fermentation Research Institute, Agency of Industrial Science and Technology, of the Ministry for Industrial Trade and Industry, Japan), *Flavobacterium incertum* No. 84-3 (FERM P-1309) and *Flavobacterium pulchlum* No. 87-5 (FERM P-1310).

The characteristic properties of Flavobacterium FERM P-1308, Flavobacterium FERM P-1309 and Flavobacterium FERM P-1310 are as follows:

1. Morphological properties:
   - Cells: Rods, blunt, 0.9–1.1 × 2.0 × 4.0 microns.
   - Mobility: Non-motile.
   - Spore: Not produced. Microcyst not produced.
   - Gram stein: Negative.
2. Growth on media.
   - Bouillon agar plate: Growth moderate, smooth, circular, entire, orange-yellowish and not spreading pigment produced.
   - Bouillon liquid: Turbid with pellicle
   - Bouillon agar stab: Liquified.
   - Litmus milk: Alkaline, peptonized.
3. Physiological properties:
   - Nitrate reduction: Negative.
   - Methyl red test: Negative.
   - Voges-Proskauer reaction: Negative.
   - $H_2S$: Produced.
   - Starch: Hydrolyzed.
   - Citric acid: Utilized
   - Pigment: Produced.
   - Urease: Negative.
   - Catalase: Positive.
   - Aerobic
   - O-F test: Metabolized by oxidation.
   - Assimilation of carbohydrates: Acid produced from glucose, fructose, maltose, starch, mannose and trehalose, and not produced from glycerol, xylose, arabinose, galactose, lactose, mannitol, inositol and sorbitol.
   - Cellulose is not decomposed.

Table 1

| Strain | Indole production | Nitrate reduction | Growth at 37°C |
|---|---|---|---|
| Flavobacterium aquatile | Negative | Negative | No growth |
| Flavobacterium fucatum | Negative | Positive | Moderate |
| No. A 9-35 | Positive | Negative | Moderate |
| No. B 84-3 | Negative | Negative | Moderate |
| No. C 87-5 | Positive | Negative | No growth |

A strict comparison of the characteristics of the strains was carried out with "Bergey's Manual of Determinative Bacteriology," 7th edition, and the strains are considered to belong to genus Flavobacterium. Their properties did not agree with *Flavobacterium aquatile* and *Flavobacterium fucatum*, which have many common properties with the present strains as shown in Table 1. The strains, accordingly, are considered to represent new species for which the names *Flavobacterium immotum*, *Flavobacterium incertum* and *Flavobacterium pulchlum* are proposed.

As can be seen from the following Table 2, *Flavobacterium immotum*, No. 9-35, *Flavobacterium incertum* No. 84-3 and *Flavobacterium pulchlum* No. 87-5 produce elastases in very high yield.

Table 2

| Strain | Amount of elastase produced (units/ml) in | | |
|---|---|---|---|
| | Medium I | Medium II | Medium III |
| Flavobacterium immotum 9-35 | 110 | 75 | 66 |
| Flavobacterium incertum 84-3 | 111 | 82 | 68 |
| Flavobacterium pulchlum 87-5 | 70 | 65 | 44 |
| Flavobacterium kawanense IAM 1014 | 8.6 | 0 | 0 |
| Flavobacterium suaveolens IAM 1131 | 8.0 | 0 | 0 |
| Flavobacterium arborescens IAM 1100 | 9.8 | 0 | 0 |
| Flavobacterium citreum IAM 1158 | 8.0 | 0 | 0 |
| Flavobacterium fuscum IAM 1181 | 8.0 | 0 | 0 |
| Flavobacterium rignese IAM 1238 | 7.2 | 0 | 0 |
| Flavobacterium sulfureum IAM 1252 | 9.0 | 0 | 0 |
| Flavobacterium ferrugineum IAM 1493 | 4.0 | 0 | 0 |
| Flavobacterium aurantianum CCM 73 | 8.4 | 0 | 0 |
| Flavobacterium flavescens CCM 1079 | 8.0 | 0 | 0 |
| Flavobacterium rhenanum CCM 298 | 3.5 | 0 | 0 |
| Flavobacterium venegrinum CCM 1080A | 8.1 | 0 | 0 |

Table 2 —Continued

| Strain | Amount of elastase produced (units/ml) in | | |
|---|---|---|---|
| | Medium I | Medium II | Medium III |
| Flavobacterium breve IFM S-15 | 9.8 | 0 | 0 |
| Flavobacterium aquatile IFO 3750 | 8.8 | 0 | 0 |
| Flavobacterium proteus ATCC 12841 | 8.0 | 0 | 0 |
| Flavobacterium okeanokoites CCM 320 | 7.7 | 0 | 0 |
| Flavobacterium heparinum ATCC 13125 | 10.3 | 0 | 0 |
| Flavobacterium odoratum ATCC 4651 | 7.1 | 0 | 0 |
| Streptomyces fradiae Waksman ATCC 10745 | 0 | 0 | 0 |
| Staphylococcus epidermis CCM 883 | 8.6 | 0 | 0 |
| Bacillus subtilis ATCC 9466 | 0 | 0 | 1.3 |
| Pseudomonas aeruginosa IFO 3455 | 0 | 5.5 | 5.5 |

Notes:
1. Elastase activity was determined for supernatant liquids from 24 hours culture broths.
2. 1 unit/ml of elastase activity is that of one milligram of elastin dissolved in one milliliter culture medium, when incubated at 40° C at pH 7.2 for 1 hour in 0.025M Tris-HCl buffer.
3. Composition of media I, II and III
    Medium I: 3 percent Casein, 4 percent glucose, 0.2 percent corn steep liquor, 0.1 percent $K_2HPO_4$ and 0.01 percent $MgSO_4$, pH 7.0.
    Medium II: 0.5 percent Elastin, 1.5 percent "Polypeptone," 1 percent yeast extract, 0.5 percent glucose, 0.1 percent $K_2HPO_4$ and 0.01 percent $MgSO_4$, pH 7.0.
    Medium III: 1 percent Meat extract, 1 percent "Polypeptone," 1 percent yeast extract, 0.5 percent glucose and 0.5 percent NaCl, pH 7.0.

The bacteria of the invention are cultured on a medium containing an assimilable carbon source, as assimilable nitrogen source, inorganic salts, organic nutrients and growth promoting substances. The assimilable carbon sources include carbohydrates such as glucose, sucrose, starch hydrolyzate, molasses and sorbitol; organid acids, such as acetic acid, propionic acid and α-ketoglutaric acid; alcohols, such as ethanol and propanol; and hydrocarbon for selected strains. The assimilable nitrogen sources include inorganic nitrogen compounds, and natural organic substances, such as protein, its hydrolyzate and amino acids. The cultivation is carried out at a pH between 5 and 9 under aerobic conditions.

Elastase produced in the culture broth may be isolated by conventional methods, such as by salting out with ammonium sulfate, by chromatography using ion exchange resin, Sephadex or ion exchange cellulose, or by precipitation with acetone or alcohol.

Elastase activity was estimated by the colorimetric method of Sacker et al (L. A. Sacker et al; Proc. Soc. Exp. Biol. and Med. 90, 323, 1955), i.e., 20 milligrams orcein elastin were digested in 2 ml of 0.025 M Tris-buffer for 60 minutes at 40° C at pH 7.2 with shaking.

Non-specific protease activity was determined by Lowry's method (Lowry O. H. et al; Journal of Biological Chemistry, 193 265, 1951).

The elastin used for determining elastase activity was prepared from ligamentum nuclae of cattle by Partridge's method (Partridge S. M. et al; Biochemical Journal 61, 11, 1955).

Elastases obtained by the present invention are highly effective in hydrolyzing elastin, although their properties slightly vary with the strain used.

The elastase produced by *Flavobacterium immotum* No. 9–35 has the following properties:
1. The elastase activity is about 18 times that of crystalline papain (manufactured by Sigma Co.).
2. The casein digesting activity is almost the same as that of the crystalline papain.
3. The optimum temperature is at 40° C.
4. The optimum pH is at 7–9.
5. The elastase is inactivated with cupric and zinc ions.
6. Heat stability 200 Micrograms of the elastase were dissolved in 1 milliliter of 0.025M Tris-buffer solution, incubated at pH 7.2 at various temperatures for 5, 20 or 60 minutes, whereupon its residual activity was determined, and is listed in Table 3.

Table 3

| Heated at (°C) | Residual activity (%) after | | |
|---|---|---|---|
| | 5 min. | 20 min. | 60 min. |
| 40 | 98 | 98 | 95 |
| 50 | 90 | 80 | 75 |
| 55 | 82 | 55 | 30 |
| 60 | 30 | 0 | 0 |

7. pH Stability

An enzyme solution containing 200 micrograms elastase per milliliter in 0.01 M-buffer solution was incubated at 37° C. for 2, 10 and 60 minutes, and the enzyme activity was determined and listed in Table 4.

The following buffer solutions were used:

| pH 2 | Sodium citrate-HCl buffer |
| pH 3–6 | Sodium citrate-citric acid buffer |
| pH 7 | 2-(N-Morpholino)ethanesulfonic acid-NaOH buffer |
| pH 8–9 | Tris-HCl buffer |
| pH 10–11 | Ammonium chloride-ammonium hydroxide buffer |

Table 4

| pH | Residual activity (%) after | | |
|---|---|---|---|
|  | 2 min. | 10 min. | 60 min. |
| 2 | 0 | 0 | 0 |
| 3 | 83 | 65 | 35 |
| 4 | 90 | — | — |
| 5 | — | 90 | 84 |
| 6 | 100 | 100 | 100 |
| 7 | 100 | 100 | 100 |
| 8 | 100 | 96 | 90 |
| 9 | 97 | 93 | 80 |
| 10 | 97 | — | 70 |
| 11 | 90 | 80 | 50 |

8. Effect of metal ions and SH reagents or elastase activity

Table 5

| Inhibitor (1 mM) | Relative Activity |
|---|---|
| None | 100 |
| NaCl | 100 |
| $SnCl_2$ | 100 |
| $MgSO_4$ | 98 |
| $LiSO_4$ | 100 |
| $FeSO_4$ | 100 |
| $BaCl_2$ | 97 |
| $MnSO_4$ | 80 |
| $CaCl_2$ | 73 |
| $CoCl_2$ | 72 |
| $CuSO_4$ | 0 |
| $ZnSO_4$ | 0 |
| $HgCl_2$ | 0 |
| CMB | 110 |
| DTT | 38 |
| Glutathione | 100 |
| L-Cysteine | 100 |
| EDTA | 100 |
| $CuSO_4$+EDTA | 40 |
| $ZnSO_4$+EDTA | 40 |
| DTT + CMB | 74 |

CMB: p-Chloromercuribenzoate
DTT: Dithiothreitol
EDTA: Ethylenediaminetetraacetate

EXAMPLE 1

1 liter culture medium containing;

| "Polypeptone" | 1.5 (%) |
|---|---|
| Elastin | 0.5 |
| Yeast extract | 1.0 |
| Glucose | 0.5 |
| $KH_2PO_4$ | 0.05 |
| $K_2HPO_4$ | 0.1 |
| $MgSO_4.7H_2O$ | 0.01 |
| pH : 7.0 | | was prepared, inoculated with *Flavobacterium immotum* No. 9-35 (FERM P-1308), and cultured at 30° C for 17 hours with aerating.

The culture broth was centrifuged to remove bacterial cells, and the supernatant liquid was found to contain 91 units per milliliter of elastase. Ammonium sulfate was added to the supernatant liquid to give 0.45 saturation. Precipitate formed and was collected by centrifugation, dissolved in water, and dialyzed in tap water for 2 hours, and acetone was added to the dialyzed solution. The precipitate formed in 70 percent acetone solution was collected, and dried in vacuo to yield 322 mg crude enzyme powder. 1 milligram of the powder solubilized 214 mg elastin when incubated at 40° C for 1 hour.

EXAMPLE 2

1 liter culture medium containing 3 percent casein, 4 percent glucose, 0.2 percent corn steep liquor, 0.1 percent $KH_2PO_4$, 0.2 percent $K_2HPO_4$ and 0.01 percent $MgSO_4.7H_2O$, of pH 7.0 was prepared, inoculated with *Flavobacterium immotum* No. 9-35 (FERM p-1308), and cultured at 30° C for 24 hours with aerating. The culture broth was found to contain 137 units/ml of elastase. The culture broth was worked up in the same way as described in Example 1, and 900 mg of crude enzyme powder were obtained. 1 milligram of the powder solubilized 114 mg elastin at 40° C in 1 hour.

EXAMPLE 3

*Flavobacterium incertum* No. 84-3 (FERM P-1309) was cultured in the same way as in Example 1, and the culture broth was found to contain 95 units/ml of elastase. The culture broth was treated in the same way as in Example 1, and 302 mg of crude elastase powder were obtained from one liter culture broth. 1 milligram of the powder solubilized 185 mg of elastin at 40° C in 1 hour.

EXAMPLE 4

*Flavobacterium pulchlum* No. 87-5 (FERM P-1310) was cultured in the same way as in Example 2, and the culture broth was found to contain 70 units/ml of elastase.

What we claim is:

1. A method of producing elastase which comprises culturing an elastase-producing strain of *Flavobacterium immotum*, *Flavobacterium incertum*, or *Flavobacterium pulchlum* on an aqueous nutrient medium containing assimilable sources of carbon and nitrogen, inorganic salts and minor organic nutrients until elastase accumulates in said medium, and recovering the accumulated elastase.

2. A method as set forth in claim 1, wherein said bacterium is *Flavobacterium immotum* FERM P-1308, *Flavobacterium incertum* FERM P-1309 or *Flavobacterium pulchlum* Ferm P-1310.

* * * * *